United States Patent Office 3,399,034
Patented Aug. 27, 1968

3,399,034
PROCESS FOR THE PREPARATION OF NITROSYL SULPHURIC ACID
Michailas Genas, Paris, and René Marcel Kern, Savigny-sur-Orge, France, assignors to Societe Aquitaine-Organico, Paris, France, a corporation of France
No Drawing. Filed Dec. 6, 1965, Ser. No. 512,021
9 Claims. (Cl. 23—139)

ABSTRACT OF THE DISCLOSURE

The present invention is directed to an improved process for the preparation of nitrosyl sulphuric acid. More specifically it relates to the preparation of nitrosyl sulphuric acid wherein sulphurous anhydride is reacted with nitric acid in a medium of sulphuric acid and in the presence of two initiators which are nitrosyl sulphuric acid and water.

BACKGROUND OF THE INVENTION

Solutions of nitrosyl sulphuric acid in sulphuric acid have numerous applications in organic synthesis, such as nitrosation, diazotisation, preparation of lactams and other uses.

It is known to prepare nitrosyl sulphuric acid by the action of sulphurous anhydride $SO_2$ on fuming nitric acid according to the reaction (1):

(1) $$SO_2 + HNO_3 \rightarrow NOHSO_4$$

Known processes based on this reaction consist of causing sulphurous gas to act on very concentrated or fuming nitric acid. In these processes the nitrosyl sulphuric acid crystallises and the reaction mass thickens rapidly and it is impossible to transform the nitric acid completely. Various laborious processes have been proposed to eliminate the remaining nitric acid. In these processes the yield of nitrosyl sulphuric acid with respect to the nitric acid is mediocre. The highest yield noted is 70%. This yield has been greatly improved by a process according to which the reaction mass is diluted by an organic solvent such as carbon tetrachloride. This organic solvent dilutes the reaction mass without, however, dissolving the nitrosyl sulphuric acid. To obtain a solution of nitrosyl sulphuric acid in sulphuric acid, it has been recommended to treat the suspension of nitrosyl sulphuric acid in an organic dilution agent, with sulphuric acid. In this process, the reaction is carried out at low temperature, from $-5°$ to $+5°$ C. The employment of organic solvent as well as the need to operate at low temperature renders the process of little value economically.

It is also known to prepare nitrosyl sulphuric acid by the action of a mixture of nitrogen oxide NO and nitrogen peroxide $NO_2$ (or $N_2O_4$) on sulphuric acid according to the reaction (2)

(2) $$NO + NO_2 + 2H_2SO_4 \rightarrow 2NOHSO_4 + H_2O$$

For this process, it is necessary to have equimolecular proportions of two nitrogen oxides.

The industrial source of the mixture of nitrogen oxides is the combustion of ammonia, a reaction serving as a basis of the manufacture of nitric acid. But it is very difficult to adjust the proportions of the two nitrogen oxides. Now, if the gas contains an excess of NO, this excess is lost, if on the other hand $NO_2$ is in excess, it forms nitric acid according to the reaction (3) below. This nitric acid is troublesome in a large number of reactions where nitrosyl sulphuric acid is employed.

Finally, a recent known process for the production of nitrosyl sulphuric acid is based on the reaction (3)

(3) $$2NO_2 + H_2SO_4 \rightarrow NOHSO_4 + HNO_3$$

In this process, only half of the nitrogen is transformed into nitrosyl sulphuric acid whence a yield at least equal to 50% with respect to the $NO_2$ results. The other half of the nitrogen is transformed into nitric acid, and accordingly the nitrosyl sulphuric acid is contaminated with a strong proportion of nitric acid.

SUMMARY OF INVENTION

The present invention, due to the work of Messieurs M. Genas and R. Kern, has for an object a process for preparing concentrated solutions of nitrosyl sulphuric acid in sulphuric acid with yields of 92 to 100%, calculated on the basis of sulphurous anhydride or of nitric acid, while avoiding the disadvantages of the known methods, previously described.

According to the present invention, there is provided a process for the preparation of nitrosyl sulphuric acid by reacting sulphurous anhydride with nitric acid, wherein the reaction is effected in a medium of sulphuric acid and in the presence of quantities of water and nitrosyl sulphuric acid as initiators of the reaction.

DESCRIPTION OF INVENTION

The initiator nitrosyl sulphuric acid may be formed by reactants in situ.

If $SO_2$ is introduced into a mixture of sulphuric acid anhydride and nitric acid, no reaction takes place. The reaction is not released even when there is added to the mixture nitrosyl sulphuric acid alone.

When water is added to the mixture of sulphuric acid and nitric acid containing nitrosyl sulphuric acid, the reaction between the sulphurous anhydride and the nitric acid leads to the formation of nitrosyl sulphuric acid.

The quantity of water necessary for the reaction to take place is proportional to the quantity of sulphuric acid in the reaction mixture.

The minimum quantity of water necessary for the reaction to be produced is such that the weight ratio between the quantity of sulphuric acid present in the mixture and the sum of the quantities of sulphuric acid and water should not exceed about 97%. Otherwise stated, if there are only considered the sulphuric acid and the water present in the reaction mixture, the concentration of sulphuric acid must be at the maximum of about 97%, in weight, with respect to the total weight $SO_4H_2 + H_2O$. It has been established besides that the minimum concentration of sulphuric acid is 70% and preferably 75%. The nitrosyl sulphuric acid is partially hydrolysed in the sulphuric acid containing water, giving sulphuric acid and nitrous acid. This hydrolysis is not troublesome in the majority of reactions where nitrosyl sulphuric acid is employed. However, if it is desired to reduce the hydrolysis and to stabilise the reactions of nitrosyl sulphuric acid, it is sufficient, after the reaction has terminated, to add to the solution sulphuric anhydride $SO_3$ or oleum to increase the concentration of sulphuric acid.

The advantage of using sulphuric acid at a lower concentration is that the speed of the reaction is greater for lower concentrations; thus the speed of reactions in sulphuric acid at 90% is four times greater than in sulphuric acid at 97%. On the other hand, the advantage of using sulphuric acid more concentrated is to permit the production of concentrated solutions of nitrosyl sulphuric acid, since the solubility of nitrosyl sulphuric acid in sulphuric acid increases with the concentration of the latter (see Table I).

The quantity of nitrosyl sulphuric acid necessary to initiate the reaction between sulphurous anhydride and nitric acid increases with the concentration of sulphuric acid and with the quantity of nitric acid present in the reaction mixture at the moment when introduction of sulphurous anhydride is commenced into the reaction mixture.

Table I below gives for a series of experiments, the values used for initiating the reaction, of the ratio percent by weight:

$$\frac{\text{nitrosyl sulphuric acid}}{\text{nitric acid}}$$

for various concentrations of sulphuric acid in the reaction mixture.

TABLE I

| Concentration of sulphuric acid, percent | Ratio $NOHSO_4/HNO_3$ by percent | Observations |
|---|---|---|
| 97 | 400 | |
| 95 | 200 | |
| 90 | 100 | |
| 86 | 30 | |
| 82 | 12 | Period of induction 4 minutes. |
| 82 | 25 | Period of induction 1 minute. |
| 82 | 50 | Period of induction 10 seconds. |
| 75 | Traces | |

As is shown in the table above, the ratios of nitrosyl sulphuric acid initiating the reaction to nitric acid may vary very considerably as the function of the concentration of sulphuric acid of the reaction mixture. Furthermore, it is noted that for one same concentration of sulphuric acid, of 82% for example, the ratio $NHOSO_4$ initiator/$NO_3H$ can exceed 12 to 50% involving only a modification of the induction period of the reaction which is the shorter the higher is the ratio.

If it is wished to reduce that quantity of nitrosyl sulphuric acid used at the beginning of the reaction, there is employed a "pied de cuve," that is to say a small quantity of reaction mixture provided for example by a previous operation and constituted by sulphuric acid and nitrosyl sulphuric acid, then gradually adding nitric acid and sulphuric acid or a solution of nitric acid in sulphuric acid while introducing the sulphurous gas.

When the concentration of sulphuric acid is in the region of 75%, traces of nitrosyl sulphuric acid suffice to initiate the reaction. The full quantity of nitrosyl sulphuric acid necessary may furthermore be formed in situ. Thus, if a flow of sulphurous anhydride is made to pass into a round bottom flask containing a solution of nitric acid in sulphuric acid at 75%, the nitrosyl sulphuric acid is not formed. If one replaces the nitrogen by air, the reaction is soon released. The origin of the initial formation of nitrosyl sulphuric acid in this case is due to the following known reactions:

(4) $3SO_2 + 2HNO_3 + 2H_2O \rightarrow 3H_2SO_4 + 2NO$ (5) $2NO + O_2 \rightarrow 2NO_2$ (6) $2NO_2 + H_2SO_4 \rightarrow NOHSO_4 + HNO_3$ When one employs sulphuric acid at 70% as solvent of nitric acid, the initial nitrosyl sulphuric acid forms by the reaction:

(7) $SO_2 + 2HNO_3 \rightarrow 2NO_2 + H_2SO_4$

The $NO_2$ formed reacts with the sulphuric acid to form the nitrosyl sulphuric acid according to the reaction (6).

The formation of nitrosyl sulphuric acid in situ may equally be caused by the addition to the mixture of sulphuric and nitric acid of mineral salts of nitrous acids or organic esters of nitrous acids, which react with the sulphuric acid to form the nitrosyl sulphuric acid. Likewise, there may be introduced into the mixture nitrous vapours which form with the sulphuric acid nitrosyl sulphuric acid (reaction 2 or 3).

The preparation of nitrosyl sulphuric acid according to the new process may be carried out in a large range of temperatures. The reaction may be carried out from −15° to 70° C. But it is not economical to operate at temperatures too low and it is preferable to avoid temperatures too elevated in order to avoid decomposition of nitrosyl sulphuric acid. The range of temperature is preferably from +15° to +30° C.

The process enables the production of very concentrated solutions of nitrosyl sulphuric acid. This concentration is only limited by the solubility of nitrosyl sulphuric acid. This depends on the concentration of sulphuric acid and on the temperature. By way of illustration the Table II below gives approximate solubilities of nitrosyl sulphuric acid. The percentages are given by weight.

TABLE II

| Temperature, °C | 20 | 50 | 50 | 20 |
|---|---|---|---|---|
| Concentration ofسulphuric acid, percent | 97 | 97 | 90 | 76 |
| Concentration of nitrosyl sulphuric acid, percent in the saturated solution | 53 | 76 | 70 | 35 |
| Weight ratio between the quantities of nitric acid and sulphuric acid in percent | 56.3 | 158 | 115 | 2 |

The solubility of nitrosyl sulphuric acid in sulphuric acid determines the respective amounts of sulphuric acid and nitric acid to be used. The third line of Table II indicates the weight ratio between the quantities of nitric acid and sulphuric acid corresponding to the concentration and to the temperature of reaction given in the table.

One may likewise have in the mixture proportions of nitrosyl sulphuric acid higher with respect to solubility, since the presence of a small quantity of nitrosyl sulphuric acid in the dispersed solid phase in the mixture is not troublesome to the reaction provided that the reaction mixture remains sufficiently fluid to permit ready diffusion of the sulphurous gas.

In place of mixing sulphuric acid with nitric acid, the mixture may be formed by causing nitrogen peroxide to react on excess sulphuric acid according to the reaction (3). It is likewise possible to introduce sulphurous anhydride $SO_2$ and nitrogen dioxide $NO_2$ simultaneously into excess sulphuric acid. Under these conditions, the nitric acid formed by the reaction (3) is transformed into nitrosyl sulphuric acid according to the reaction (1).

Additionally, in the processes using the reaction (2) and in the case where the mixture of nitrogen oxides contains a molar ratio $NO/NO_2$ less than 1, that is to say containing an excess of $NO_2$ as is the case of the solution of nitrosyl sulphuric acid in sulphuric acid containing nitric acid, the latter may be transformed into nitrosyl sulphuric acid according to the present process. This has a double advantage which is to eliminate the troublesome nitric acid and to improve the yield of nitrosyl sulphuric acid with respect to the oxides of nitrogen.

The practical ways in which the process according to the invention may be realised are very varied. It may be operated in discontinuous and in continuous fashion. In the discontinuous mode, a flow of gaseous sulphurous anhydride may be introduced into the mixture suitably with sulphuric acid, water, nitrosyl sulphuric acid and nitric acid. Likewise the one may constitute a "pied de cuve" of a suitable mixture of the reactants and gradually feed it in either in nitric acid, or in a solution of nitric acid into the sulphuric acid introducing at the same time $SO_2$.

To effect the mixture of the liquid phase with the $SO_2$, there may be employed the usual methods used in reactions between a gas and a liquid. In the continuous manner of working, the sulphurous anhydride and the sulphur nitric mixture may be introduced simultaneously. The product of the reaction in solution flows via an overflow.

A very sensitive indicator enables the end point of the reaction between the $SO_2$ and the nitric acid to be determined. When the nitric acid is completely transformed, the excess of $SO_2$ causes the appearance of a violet colouration. When this colour change is produced, it is important to stop the introduction of SO₂ since excess of SO₂ destroys the nitrosyl sulphuric acid formed. In the discontinuous modes of operation of the process in which the addition of reactants is done gradually, the colour change to blue reveals a deficiency of nitric acid. In the continuous mode of operation, the reaction mixture must be maintained constantly at the limit of the colour change by an adjustment of the SO₂ and the nitric acid feeds.

The following examples illustrate, by way of non-limiting examples, the process according to the invention.

Example 1

In a gas wash bottle of 500 cm.³ with a fritted plate, furnished with a thermometer, there are filled:

|  | Gms. |
|---|---|
| Sulphuric acid at 90% | 250 |
| Nitrosyl sulphuric acid | 100 |
| Nitric acid at 95% (47.5 gms. HNO₃ 100%) | 60 |

A flow of sulphurous anhydride is passed through the temperature being maintained between 20° and 25° C. with the aid of an eternal refrigeration and avoiding all gaseous release at the mouth of the apparatus. The end of the reaction is marked by a change of colour of the reaction mass which becomes faintly blue-violet. At this moment, the introduction of the sulphurous gas is stopped. A solution of 448 gms. at 43.2% of nitrosyl sulfuric acid is obtained, namely 193.7 gms. of nitrosyl sulphuric acid. There is thus formed 93.7 gms. of nitrosyl sulphuric acid. Yield is 97.0% with respect to the nitric acid employed.

Example 2

In a balloon flask of 5 litres, furnished with an energetic agitator, with a thermometer with bromine ampule for the introduction of the reactants, an inlet for gas at the bottom of the apparatus and of an exit tube for the unreacted gases followed by a bubbler supplied with sulphuric acid, a bottom layer, constituted by 20 gms. of 41.10% nitrosyl sulphuric in 93% sulphuric acid. The agitation having commenced, some sulphurous gas is introduced into the liquid at the same time as there is gradually introduced a constituted solution by:

|  | Gms. |
|---|---|
| HNO₃ at 95% (1.185 gms. HNO₃ 100%) | 1.248 |
| H₂SO₄ at 93% | 3.366 |

The temperature is maintained at 20°–25° C. by external refrigeration. The introduction of SO₂ is regulated in such a manner that there may be no release of gas and that the reaction mixture does not become bluish until the end of the introduction of the sulphonitric solution. When all the sulphonitric mixture has been introduced, which takes about four hours and so that the nitrosyl sulphuric acid solution contains practically no nitric acid, the introduction of the sulphurous gas is continued until the appearance of a light blue violet colouration so that it can be made to disappear by the addition of several drops of nitric acid.

A solution of 5.836 gms. is obtained, having a concentration of 40.4% in nitrosyl sulphuric acid, namely 2.360 gms. of nitrosyl sulphuric acid. Taking into account the 8 g. of nitrosyl sulphuric acid introduced at the beginning, the yield in nitrosyl sulphuric acid is 98.5%.

Example 3

In a balloon flask of 3 litres furnished with an energetic agitator, with a thermometer, a bromine ampule for the introduction of the reactants, with an inlet for gas at the bottom of the apparatus and a release tube connected to a bubbler supplied wtih sulphuric acid, a bottom layer is introduced which consists of:

|  | G. |
|---|---|
| 95% nitric acid | 450 |
| 97% sulfuric acid | 1750 |

The temperature is maintained with the aid of external cooling at 25°–30° C. and the introduction of the reactants is done in such a manner that all the sulphurous gas is absorbed and the reaction mixture does not become bluish.

The introduction is carried out in about 4 hours. 2.662 g. of solution at 32–7% of nitrosyl sulphuric acid, 872.5 g. of NOHSO₄ of which 849 gms. formed during the reaction, is finally obtained, namely a yield of 98.5 percent with respect to the nitric acid.

Example 4

In this example, the nitrosyl sulphuric acid initiator is prepared in situ as also is the sulphuric acid.

In a balloon flask of 250 cubic cms. furnished with a good agitator, a thermometer and an ampule of introduction for the peroxide of nitrogen NO₂ or N₂O₄, liquid, with an introduction tube for gas and a release tube, 100 g. of 90% sulphuric acid is filled and 25 g. of nitrogen peroxide liquid is gradually introduced with agitation, a temperature of 20° being maintained by external cooling, in such a manner that there is no release of gas at the outlet of the apparatus. There is obtained 124.3 g. of solution containing 33.6 g. of nitrosyl sulphuric acid, i.e. 27% and 16.7 g. of HNO₃, i.e. 13.4%. The yield of nitrosyl sulphuric acid and of nitric acid with respect to nitrogen peroxide is 97.5%.

In the same equipment and into the reaction mixture obtained, sulphurous anhydride is introduced, under good agitation and at a temperature of 20–25° C. maintained with the aid of external cooling, in such a way that it does not release gas at the outlet of the apparatus and until commencement of the appearance of a violet tint characteristic of the end of the reaction.

The weight of the reaction mixture obtained is 141 g. It contains 47.4% of nitrosyl sulphuric acid, namely 67 g. The yield with respect to nitrogen peroxide is 97.2%.

Example 5

This example illustrates the use of a bottom layer and one of the methods of preparation in situ of the nitric acid.

In a balloon flask of 250 cubic cms. furnished with an energetic agitator, a thermometer, a tube for introduction of SO₂, a bromine ampule for the introduction of liquid nitrogen peroxide, an outlet tube for the gas, 140 g. of a solution of 12% nitrosyl sulphuric acid and the 90% sulphuric acid (16.8 g. of NOH₅O₄) are charged. Some sulphurous gas and some nitrogen peroxide NO₂ or N₂O₄ liquid are led simultaneously into the reaction mass. The introduction of the reactants is regulated in such a way as to release no gas and to let the mixture become blue. The temperature is maintained with the aid of an external cooler between 20 and 25° C. After introduction of 25 g. of nitrogen peroxide and of the stoichiometrically corresponding quantity of sulphurous gas, the reaction is stopped. There are obtained 209 g. of 40.3% solution nitrosyl sulphuric acid, namely 84.3 g. of nitrosyl sulphuric acid, of which there has been formed 84.3−16.8=67.5 g. The yield is 97.8%.

We claim:
1. A process for the preparation of nitrosyl sulphuric acid comprising reacting sulphurous anhydride with nitric acid at a temperature between −15° and 70° C. in a medium of sulphuric acid and in the presence of two initiators which are a quantity of nitrosyl sulphuric acid variable with the concentration of sulphuric acid and an initial quantity of water, the amount of water contained in the reaction mixture being such that the weight of sulphuric acid with respect to the sum of the weights of sulphuric acid and water varies from 70 to 97%.

2. A process as claimed in claim 1, wherein the proportion by weight between the quantities of nitric acid and the sum of the quantities of sulfuric acid and water is such that the nitrosyl sulfuric acid formed by the reaction of sulfurous anhydride on nitric acid can dissolve in the sulfuric acid.

3. A process as claimed in claim 1, wherein the proportion of nitrosyl sulfuric acid initiator of the reaction increases with the concentration of sulfuric acid and the initial quantity of nitric acid up to about 4 times the weight of nitric acid initially present.

4. A process as claimed in claim 1, wherein the nitrosyl sulfuric acid initiator of the reaction is formed in situ by introduction of reactants forming nitrosyl sulfuric acid.

5. A process as claimed in claim 4, wherein the nitrosyl sulfuric acid acting as initiator is prepared by the action of nitrogen peroxide on excess sulfuric acid.

6. A process as claimed in claim 4, wherein the nitrosyl sulfuric acid initiator is prepared by a mixture of nitric oxide NO and of nitrogen peroxide $NO_2$ on excess sulfuric acid.

7. A process as claimed in claim 1, wherein said temperature is from $+15°$ to $+30°$ C.

8. A process as claimed in claim 2, wherein said preparation of solutions of nitrosyl sulfuric acid in sulfuric acid is carried out under increased pressure.

9. A process as claimed in claim 2, wherein said preparation of solutions of nitrosyl sulfuric acid in sulfuric acid is carried out in continuous manner.

References Cited

UNITED STATES PATENTS

| | | | |
|---|---|---|---|
| 1,784,945 | 12/1930 | Pinck | 23—139 X |
| 2,683,708 | 7/1954 | Dickey et al. | 23—139 X |
| 3,149,913 | 9/1964 | Ferstandig et al. | 23—139 |
| 3,180,834 | 4/1965 | Karsay et al. | 23—139 X |
| 3,269,954 | 8/1966 | De Rooij | 23—139 X |
| 3,307,904 | 3/1967 | Ysuda et al. | 23—139 |

O. R. VERTIZ, *Primary Examiner.*

H. T. CARTER, *Assistant Examiner.*